United States Patent [19]

Mulchandani et al.

[11] Patent Number: 5,700,513
[45] Date of Patent: Dec. 23, 1997

[54] LIQUID NUTRITIONAL PRODUCT CONTAINING IMPROVED STABILIZER COMPOSITION

[75] Inventors: Rohini Prakash Mulchandani, Worthington; Mohamed Ibrahim Mahmoud, Columbus, both of Ohio

[73] Assignee: Abbott Laboratories, Abbott Park, Ill.

[21] Appl. No.: 588,957

[22] Filed: Jan. 19, 1996

[51] Int. Cl.$^6$ .................... A23L 1/05; A23L 1/304
[52] U.S. Cl. .................... 426/590; 426/74; 426/573; 426/575; 426/801; 426/800; 426/804
[58] Field of Search .................... 426/74, 590, 801, 426/800, 804, 573, 575

[56] References Cited

U.S. PATENT DOCUMENTS

| | | | |
|---|---|---|---|
| 3,544,333 | 12/1970 | Glabe et al. | 99/85 |
| 4,282,262 | 8/1981 | Blake | 426/565 |
| 4,389,426 | 6/1983 | Reissmann et al. | 426/602 |
| 4,427,704 | 1/1984 | Cheney et al. | 426/104 |
| 4,479,973 | 10/1984 | Holley | 426/573 |
| 4,609,554 | 9/1986 | Barua et al. | 426/43 |
| 4,623,552 | 11/1986 | Rapp | 426/575 |
| 4,684,533 | 8/1987 | Kratochvil | 426/575 |
| 4,748,026 | 5/1988 | Keefer et al. | 426/43 |
| 4,921,877 | 5/1990 | Cashmere et al. | 514/866 |
| 4,925,686 | 5/1990 | Kastin | 426/575 |
| 4,952,686 | 8/1990 | Renn et al. | 536/114 |
| 5,019,414 | 5/1991 | Valdes | 426/573 |
| 5,021,245 | 6/1991 | Borschel et al. | 426/2 |
| 5,087,471 | 2/1992 | Combes et al. | 426/573 |
| 5,104,677 | 4/1992 | Behr et al. | 426/590 |
| 5,108,767 | 4/1992 | Mulchandani et al. | 426/72 |
| 5,132,128 | 7/1992 | Rockland | 426/658 |
| 5,292,544 | 3/1994 | Coutant et al. | 426/575 |
| 5,416,077 | 5/1995 | Hwang et al. | 514/54 |

FOREIGN PATENT DOCUMENTS

| | | | |
|---|---|---|---|
| 0480305 | 4/1992 | European Pat. Off. | 426/575 |

OTHER PUBLICATIONS

Izzo et al, 1995. "Using Cellulose Gel and Carrageenan to Lower Fat and Calories in Confections", Food Technology, Jul. 1995, pp. 45–49.

Schenz, T. and Fugitt, M. (1992), "The rheology of thin liquids," in *Gums and Stabilizers for the Food Industry 6*, eds. Phillips, G.O., Williams, P.A., and Wedlock, D.J., Oxford University Press, pp. 113–116.

Kaur–A., Minhas–KS. and Sidhu–JS, "Natural and Synthetic Gums: Properties and Uses in Food Industry", Indian Food Industry, 1993, 12(2) pp. 27–32.

R.S. Igoe, "Hydrocollid Interactions Useful in Food Systems", Food Technology, Apr. 1982, pp. 72–74.

Alfred J. Finberg, "Formulating low calorie foods with Carbohydrate Gums", Food Technology, Mar. 1972, pp. 28–30.

*Primary Examiner*—Helen Pratt
*Attorney, Agent, or Firm*—Donald O. Nickey; Thomas D. Brainard

[57] ABSTRACT

The present invention is a liquid nutritional product with improved physical stability comprising: (a) a liquid nutritional mixture containing fat at a concentration sufficient to have the liquid nutritional mixture be susceptible to creaming and containing suspended minerals present at a concentration sufficient to have the liquid nutritional mixture be susceptible to sedimentation; (b) a carrageenan/microcrystalline cellulose/carboxymethyl cellulose additive composition comprising: (i) iota-carrageenan present in an amount of about 100–800 ppm of the liquid nutritional product; (ii) a mixture of microcrystalline cellulose/carboxymethyl cellulose, the mixture present in an amount of from about 600–3000 ppm of the liquid nutritional product. In a preferred embodiment, microcrystalline cellulose is present in a range of from about 1000 ppm to about 2500 ppm, while the iota-carrageenan is present in a range of from about 100 ppm to about 300.

22 Claims, No Drawings

LIQUID NUTRITIONAL PRODUCT CONTAINING IMPROVED STABILIZER COMPOSITION

TECHNICAL FIELD

The present invention relates generally to liquid nutritionals, and more particularly, to a physical stability system improvement for use in liquid nutritional products. The present invention is in the field of liquid nutritional products principally used to provide a complete or substantially supplementary source of nutrition. These liquid nutritional products contain sufficient amounts of nutrients such as minerals, fats and proteins which render them subject to creaming and sedimentation. Most problematic are the insoluble minerals, such as insoluble calcium salts which render these nutritional products subject to sedimentation over their shelf lives.

BACKGROUND

The liquid nutritional industry is a multi-billion dollar a year business. Two of the major components of the industry are infant formula and medical nutritionals. These types of liquid nutritionals contain an appreciable amount of minerals suspended in a liquid medium. The presence of these minerals is vitally important to the efficacy of the liquid nutritionals. However, these liquid nutritional products contain sufficiently high amounts of nutrients such as carbohydrates, fats and proteins, and sufficiently high amounts of insoluble minerals, such as insoluble calcium salts, to render them subject to creaming and sedimentation over their shelf lives.

For decades, the usage and marketing of liquid nutritionals traditionally have been confronted with these two major problems.

In creaming, whereby the fat globules in the liquid nutritional float to the top of the product, a problem can arise if these fat globules harden, effectively forming a seal across the top of the liquid nutritional's container. Additionally, these hard, fatty deposits can block or clog feeding tubes or nipples, and can give the liquid nutritional product an unappealing appearance and cause nutritional insufficiencies.

In the case of sedimentation, minerals come out of the solution and settle to the bottom of the product container. The problem of sedimentation is made more acute where the sediment hardens into a cementitious type of material known as "nondispersible sediment". The problem with nondispersible sediment is two-fold. First, the liquid nutritional product is reduced in its nutrient content, as the nondispersible sediment will not go back into the solution even upon shaking the container. The second problem with nondispersible sediment is that it, along with hardened creaming deposits, can plug feeding tubes or nipples, and can detract from the appearance and appeal of the product.

In the field of liquid nutritional products, stabilizers are used to maintain the rheological properties of these liquids over their shelf lives while maintaining their organoleptic properties and appearance. Modified stabilizer systems have been proposed to address sedimentation problems, however, they have met with limited success. These systems permit the minerals to be suspended longer, but nevertheless they ultimately fall from solution. Thus, there is a need in the industry for improved stabilizer systems.

One of the key components used in liquid nutritionals for product stability is carrageenan. Carrageenan is a group of highly sulfated, high molecular weight, linear polysaccharides. The functionality of carrageenan can be attributed to its chemical structure, especially the ester sulfate group content and molecular size. There are three main types of carrageenan: kappa, lambda, and iota.

When heated in water, dissolved carrageenan molecules exist as random coils. Upon cooling and in the presence of appropriate cations, kappa and iota carrageenan molecules form double helix domains and aggregate to form gels of different textures. Kappa-carrageenan forms a strong rigid gel through ion-bridging between negatively charged sulfate groups and potassium ions. Iota-carrageenan forms elastic gels in the presence of calcium ions due to the higher sulfate group content which imposes a higher electrostatic repulsive force and keeps molecules and helices from getting too close together to form a tight and rigid gel. Lambda-carrageenan will not gel because of the high sulfate group content and the corresponding strong repulsive force which keeps molecules from forming double helices and gels.

One object of the present invention has been to find alternatives to known carrageenan (Cg)—based stabilizers in improving the physical stability of medical and pediatric liquid nutritional products, particularly with regard to the avoidance of sedimentation of insoluble minerals and the creaming of the fats. Reasons for seeking improved stabilizer compositions include (1) developing one or more acceptable alternatives to carrageenans (Cg) for use in liquid nutritional products, especially for those matrices where stabilization with Cg proves inadequate, and (2) to allow for a reduction on the dependence of Cg as stabilizers since Cg does not enjoy universal acceptance, especially in the European marketplace.

Carrageenan has heretofore been used as a thickening agent in the food industry, for such products as cheese, mayonnaise, pudding, frozen dairy desserts, and pet food. The use of carrageenan in connection with solid food products is disclosed in U.S. Pat. Nos. 4,427,704; 4,623,552; 4,282,262; 3,544,333; 4,389,426; 4,609,554; 4,684,533; 4,748,026; and 4,479,973. The use of iota-carrageenan in liquid nutritional products is disclosed in U.S. Pat. No. 5,416,077. The teachings of U.S. Pat. No. 5,416,077 are incorporated herein by reference.

U.S. Pat. No. 5,416,077 discloses and claims a liquid nutritional product that is susceptible to creaming and sedimentation that contains 50 to 1000 parts per million of iota-carrageenan. This patent does not suggest the present invention which is based upon the synergistic activity of a iota-carrageenan/microcrystalline cellulose/carboxymethyl cellulose combination to greatly reduce sedimentation and creaming.

The use of a mixture or a reaction product of at least one carrageenan and at least one glucomannan in foods products, and especially as part of gelling systems for use in the preparation of gelled or thickened food products is disclosed in U.S. Pat. No. 4,427,704 to Cheney, et al. Although the carrageenan is disclosed as being any form of carrageenan or a mixture thereof, the preferred carrageenan types contain kappa-carrageenan.

The use of kappa-carrageenan, iota-carrageenan and mixtures thereof in a pudding composition is disclosed in U.S. Pat. No. 4,623,552 to Rapp. Typically the total carrageenan content is in the range of from about 0.05% to about 1.0% by weight; preferably from about 0.1% to about 0.5%, and most preferably from about 0.1% to about 0.3% by weight. In the three examples illustrating the U.S. Pat. No. 4,623,552 invention, kappa-carrageenan is used exclusively or in greater concentrations than are associated with iota-carrageenan.

The use of carrageenan as a stabilizer gum in a dairy based dessert mix composition, which upon aeration can be statically frozen to provide aerated frozen desserts, is disclosed in U.S. Pat. No. 4,282,262 to Blake. The only specific type of carrageenan mentioned is kappa-carrageenan.

The use of iota-carrageenan in the preparation of a nonfat milk macaroni product is disclosed in U.S. Pat. No. 3,544,333 to Glabe, et al. Preferably the iota-carrageenan content is in the range of from about 0.01% to 0.2% by weight.

The use of a gelling system for a low-fat spread comprising at least one hydrocolloid capable of forming a linear gel structure such as lambda-carrageenan, and at least one other hydrocolloid capable of forming a spherical gel structure such as iota-carrageenan, is disclosed in U.S. Pat. No. 4,389,426 to Reissmann, et al. Other suitable hydrocolloids are also mentioned.

The use of carrageenan as a thickener in aseptic yogurt is disclosed in U.S. Pat. No. 4,609,554. The concentration of the carrageenan is in the range of from about 0.1% to 0.8%.

The use of carrageenan, specifically kappa-carrageenan, of from about 0.5% to about 3.0% by weight along with fat, gelatin and water in an imitation cheese product is disclosed in U.S. Pat. No. 4,684,533 to Kratochvil. The gelatin and kappa-carrageenan are present as a structurally firm, continuous aqueous carrageenan/gelatin phase matrix at refrigeration temperatures.

The use of carrageenan in a process for production of a no-starch shelf stable yogurt product is disclosed in U.S. Pat. No. 4,748,026 to Keefer, et al. The preferred weight range of the carrageenan is about 0.05% to about 3.0% by weight. The carrageenan in this invention serves as a calcium binder to inhibit curd formation in the yogurt.

The use of iota-carrageenan in a gelled milk composition, such as gelled milk desserts, is disclosed in U.S. Pat. No. 4,479,973 to Holley. The invention utilizes ultra high temperature processing. The concentration of the iota-carrageenan is in the range of about 0.15% to about 0.5% by weight.

As the above patents disclose, the carrageenan most widely and often used in the food industry is kappa-carrageenan. However, while kappa-carrageenan is an effective stabilizer in connection with solid food, it must be recognized that the problems of sedimentation, sag and creaming are not present in solid foods as they are in liquid nutritional products.

It is thus apparent that a need exists for further physical stability improvement in liquid nutritional products which provides an extremely shelf-stable liquid nutritional with minimal problems from sag, sedimentation, and creaming, while reducing dependency upon carrageenan. While the liquid nutritional of this invention is particularly suited for infant formulas and medical nutritionals, it is contemplated herein that the invention would be useful for any liquid nutritional product that heretofore has encountered the problems of sag, sedimentation, or creaming.

The age-dependent physical stability problems of creaming and sedimentation are present in many liquid nutritionals. Emulsifiers, like lecithin, are commonly added to minimize creaming. Stabilizers like carrageenan are commonly utilized to reduce whey separation and sediment, and also reduce creaming (a secondary effect). However, the levels needed to eliminate such defects result in products having a high viscosity which makes them "unacceptable" for numerous reasons, i.e., tube feeding. So, final addition rates of stabilizers are a "compromise" leading to insufficient stabilization. In metal cans, the defects of creaming and sedimentation are less apparent. However, with changes in packaging, i.e., transparent plastics and their increased penetration into the retail market, the need to formulate shelf stable, defect-free products has become a very high priority.

Prior art products find it acceptable to "disperse" the sediment, but they have not eliminated it. Nutrient delivery is improved but fortification rates (of insoluble minerals) still remain high (115%–150%). In a ready-to-consume package, such a formulation would still yield a sediment layer if opened without shaking. Accordingly, an object of the present invention is to produce virtually "defect-free" formulations.

In the absence of stabilization with hydrocolloids, liquid nutritional products such as Ensure® complete liquid nutritional, commercially available from the Ross Products Division of Abbott Laboratories, Columbus, Ohio, show evidence of creaming and sediment formation over shelf life which typically is from 10 to 18 months. As currently stabilized with 500 ppm Viscarin® SA 359 iota-carrageenan (I-Cg), the creaming and sediment defects are reduced but not eliminated in Ensure®. In this regard, one of the challenges of providing a satisfactory stabilizer is to do so while holding down the total amount of carrageenans (particularly these that add viscosity and cause product gelling, such as kappa-carrageenan). It is most desirable to maintain the mount of carrageenan to below about 500 ppm to minimize gelation in the liquid nutritional product.

An important goal of the present invention is to reduce or eliminate physical stability defects in liquid nutritional products such as Ensure®. In this regard, an aspect of the present invention is to provide a liquid nutritional product with an iota-carrageenan/microcrystalline cellulose/carboxymethyl cellulose stabilizer which maximizes the individual advantages of each component (namely, creaming reduction and low viscosity suspension, respectively) while minimizing their individual disadvantages (namely, gelation and no impact on creaming, respectively).

It is also an object of the present invention to provide a liquid nutritional product having the advantages of reduced creaming and sedimentation even when having increased mineral loading, such as in the case of higher calcium levels, such as those in liquid nutritional products which have higher levels of tricalcium phosphate; or in liquid nutritional products such as Ensure® Plus also having calcium present as tricalcium phosphate. This is particularly important as there have been recent increases in the recommended amounts of calcium intake.

In light of the present disclosure, or through practice of the present invention, other advantages or the solutions to other problems may become apparent.

SUMMARY OF THE INVENTION

The present invention involves the use of iota-carrageenan/microcrystalline cellulose/carboxymethyl cellulose blend(s) to produce homogeneous liquid nutritional s products which are physically stable (i.e., substantially flee of creaming, wheying or sedimentation) throughout shelf-life. The composition of the blend or stabilizer system of the present invention varies with the product matrix and its "creaming/sediment" load. Though not limited to its theory of operation, the present invention is believed to reside in a synergistic effect by stabilizing viscoelastic structure; that is, the additive combination is significantly more pseudoplastic than is each component alone, while imparting product characteristics like low viscosity, appearance and neutral flavor (i.e., the absence of objectionable flavor) considered very acceptable for end use. The present invention enables the formulation of liquid nutritional products with excellent physical stability, which provide complete nutrient delivery and therefore reduced fortification demands.

No special equipment is required, so liquid nutritional products of the present invention may be produced in accordance with processes known in the art for producing liquid nutritional products. In general, products utilizing the present invention are manufactured using procedures known in the art of liquid nutritionals. It is preferred that, during processing, the iota-carrageenan is added to the oil component of the nutritional product and the microcrystalline cellulose/carboxymethyl cellulose component, such as Avicel® CL 611 is fully hydrated first in an aqueous component.

There is disclosed in accordance with the present invention a liquid nutritional product with improved physical stability comprising: (a) a liquid nutritional composition containing fat at a concentration sufficient to have said liquid nutritional mixture be susceptible to creaming and suspended minerals present at a concentration sufficient to have the liquid nutritional mixture be susceptible to sedimentation; and (b) a carrageenan/microcrystalline cellulose/carboxymethyl cellulose additive composition comprising: (i) iota-carrageenan present in an amount of about 100–800 ppm of said liquid nutritional product; (ii) a mixture of microcrystalline cellulose and carboxymethyl cellulose, said mixture present in an mount of from about 600–3000 ppm of said liquid nutritional product.

There is also disclosed in accordance with the present invention a liquid nutritional product with improved physical stability comprising: (a) a source of carbohydrate; (b) a source of protein; (c) a source of fat; and (d) a source of suspendable minerals; wherein said liquid nutritional product contains sufficiently high mounts of minerals and fat to render the liquid nutritional product subject to creaming and sedimentation; and a carrageenan/microcrystalline cellulose/carboxymethyl cellulose additive composition comprising: (i) iota-carrageenan present in an amount of about 100–800 ppm of the liquid nutritional product; (ii) a mixture of micro crystalline cellulose and carboxymethyl cellulose, the mixture present in an amount of from about 600–3000 ppm of the liquid nutritional product.

One skilled in the art of liquid nutritionals will understand that due to the requirements of protein, carbohydrate, fats, minerals and vitamins in a given formulation, these formulations experience separation of the oil component from the mixture (creaming) and the fallout of the insoluble components such as tricalcium phosphate from the formulation (sedimentation). It is also critical in the industry that the liquid nutritionals (water based) not gel or have viscosities which would prevent their use as tube-fed products.

In an embodiment of the present invention, the amount of microcrystalline cellulose/carboxymethyl cellulose (MCC/CMC) and the iota-carrageenan (i-Cg) are in the given ranges and are present in a ratio range of from about 16:1 to about 1.2:1, and more preferably in a ratio range of from about 16:1 to 2.0:1 (MCC/CMC:i-Cg).

Of the formulations of the present invention, it is preferred that the microcrystalline cellulose/carboxymethyl cellulose is present in a range of from about 1000 ppm to about 2500 ppm, while the iota-carrageenan is present in a range of from about 100 ppm to about 300 ppm. It has been found that good stability results have been attained with the stabilizer system of the present invention with the components in the given ranges and wherein as the amount of the iota-carrageenan increases the amount of the microcrystalline cellulose/carboxymethyl cellulose will decrease. Thus, it has been discovered that there exists an inverse relationship between the two components.

It has been found that at higher amounts of microcrystalline cellulose/carboxymethyl cellulose (e.g., 2400 ppm), the ratio to the iota-carrageenan is preferably 16:1 (MCC/CMC:i-Cg), while at lower amounts of microcrystalline cellulose/carboxymethyl cellulose (e.g., 1200 ppm), the ratio to the iota-carrageenan is preferably 3.7:1. Indeed, the results reported with respect to the present invention suggest that a relationship exists with respect to the amount of microcrystalline cellulose/carboxymethyl cellulose to the iota-carrageenan content. This relationship appears to hold for formulations with microcrystalline cellulose/carboxymethyl cellulose as low as 600 ppm where the iota-carrageenan content is 500 ppm and the ratio extends as low as 1.2:1.

The mineral content of the liquid nutritional product typically will include a source of suspendable calcium such as tricalcium phosphate present in an amount above about 0.2 grams per liter of the liquid nutritional product; and/or calcium carbonate, calcium titrate, or mixtures thereof. Other insoluble minerals may include insoluble magnesium salts. The mineral content may also be made up of more soluble minerals, such as soluble magnesium, sodium and potassium salts.

Representative of the type of iota-carrageenan useful in this invention is represented by Viscarin® SA 359 or Viscarin® SD 389 (commercially available from FMC Corporation), a relatively weak gelling iota-carrageenan. Those skilled in this art will appreciate that numerous suppliers can provide the various forms of the iota-carrageenan and that they would be suitable for use in the present invention.

Representative of the microcrystalline cellulose/carboxymethyl cellulose (hereinafter MCC/CMC) useful in this invention is represented by Avicel® CL 611 (85% microcrystalline cellulose with 70% colloidal content, co-processed with 15% low viscosity carboxymethyl cellulose), commercially available from FMC Corporation. Other colloidal MCC/CMCs that may be useful include Avicel® RC 581 (89% microcrystalline cellulose with 70% colloidal content, co-processed with 11% medium viscosity carboxymethyl cellulose), Avicel® RC 591 (88% microcrystalline cellulose with 70% colloidal content, co-processed with 12%, 50/50 medium/low viscosity carboxymethyl cellulose) and Avicel® RC 501 (91% microcrystalline cellulose with 70% colloidal content, co-processed with 9% medium viscosity carboxymethyl cellulose).

In one embodiment of the present invention, the iota-carrageenan is Viscarin® SA 359 and is present in an amount of about 300 to 550 ppm, and that the mixture of s MCC/CMC is Avicel® CL 611 and is present in an amount of about 600 to about 1500 ppm. In another embodiment the liquid nutritional product of the present invention, the iota-carrageenan is Viscarin® SD 389 and is present in an amount of about 350–650 ppm, and the mixture of MCC/CMC is Avicel® CL 611 and is present in the range from 750 to 1200 ppm. Another preferred mixture of the liquid nutritional product of the present invention contains iota-carrageenan in the form of Viscarin® SA 359 and is present in an amount of about 325 ppm, and the mixture of MCC/CMC is Avicel® CL 611 and is present in an amount of about 1200 ppm.

Yet another preferred mixture of the liquid nutritional product of the present invention contains iota-carrageenan as Viscarin® SA 359 present in an amount of about 150 ppm, and a mixture of MCC/CMC in the form of Avicel® CL 611 present in an amount of about 2400 ppm. In yet another preferred embodiment of this invention, the i-Cg is Viscarin® SD 389 present in an amount of about 400–650 ppm and the MCC/CMC is Avicel® CL 611 at about 950–1050 ppm. Another specific embodiment of the invention is Viscarin® SD 389 at about 600 ppm and the Avicel® CL 611 is present at about 750 ppm.

It has been found that when the insoluble mineral content is further increased (i.e., tricalcium phosphate) the liquid nutritional product according to this invention will require higher levels of iota-carrageenan and MCC/CMC to achieve the desired stability over a given shelf life (i.e., 12 months). Thus, in one embodiment of this invention, the liquid nutritional product contains iota-carrageenan in an amount of about 500 ppm and the MCC/CMC is in an amount of about 2400 ppm.

DETAILED DESCRIPTION OF THE PREFERRED EMBODIMENTS

In accordance with the foregoing summary, the following examples present a detailed description of several embodiments of the present invention, which are presently considered to represent the best mode of the invention disclosed and claimed herein.

SPECIFIC FORMULATION EXAMPLES AND TEST RESULTS

The following are examples of liquid nutritional formulations that may be prepared in accordance with the present invention. Also presented are results of product stability testing for those formulations and theology data that demonstrate the novel and unobvious character of this invention.

EXAMPLE 1

Base Formulations

To evaluate the parameters of the present invention, two base or foundation nutritional formulations were used. The components of the formulations are found in Table I.

TABLE I

Base Formulations for Evaluation of the Invention

| Ingredient | Base I Amount | Base II Amount |
|---|---|---|
| Water | 34.9 kg | 35 kg |
| Proteins | 1.8 kg | 1.8 kg |
| Carbohydrates | 6.7 kg | 6.8 kg |
| Oils | 1.5 kg | 1.2 kg |
| Vitamins - Oil Soluble | 1.7 g | 3.3 g |
| Lecithin | 65.8 g | 66.3 g |
| Ultra Trace Minerals | 6.83 g | 13.7 g |
| Minerals | 323.9 g | 422.04 g |
| 1N KOH | 190 ml | 100–160 ml |
| Choline Chloride | 16.3 g | 32.7 g |
| Vitamin C | 17.5 g | 17.5 g |
| Water Soluble Vitamins | 3.3 g | 3.3 g |
| 45% KOH | 10–20 g | 10–40 g |

Base I compared to Base II is a high oil- or fat-containing product that contains about one half the oil soluble vitamins of Base II and about one half the ultra trace minerals. Most importantly, Base II has a much higher mineral load. The major mineral difference was that Base II contained almost twice the amount of tricalcium phosphate (62.1 g versus 140.6 in Base II) and contained 45.4 g of magnesium phosphate whereas Base I did not contain any magnesium phosphate. Base I represents currently available commercial product while Base II represents a product containing lower fat, higher calcium, phosphorus and specific vitamins. Base II also represents where the liquid nutritional industry is headed relative to currently recommended nutritional guidelines.

In general, the base formulations were prepared by combination of various slurries. Thus, a protein in hot water slurry was prepared using the specified protein. To this slurry was added a portion of the carbohydrate and this mixture was then held hot in a tank.

The oil or lipid component in a separate tank was heated. To the oil component was added the oil soluble vitamins, lecithin, the remaining proteins and the experimental mount of iota-carrageenan. This mixture was held hot in a tank.

In a separate tank a water/minerals mixture was prepared. To this mixture was added the ultra trace minerals and the remaining carbohydrates.

The specified amount of Avicel® CL-611 was added to cold water and mixed. The water slurry was heated and the mixture was allowed to hydrate for 5 minutes. The protein in water slurry and the oil slurry were added to the Avicel® water slurry with agitation.

Lastly, the minerals/carbohydrate slurry was added. This blend, composed of the various slurries, was processed. The water soluble vitamins and the final amount of water were added after processing.

In general, those skilled in the art will understand that various modifications can be made to prepare the nutritional products as the timing and order of addition of the elements of this invention are not critical. Techniques such as those found in U.S. Pat. Nos. 5,108,767; 5,104,677; 5,416,077; 4,921,877; and 5,021,245 can be used. The teachings of these patents are incorporated herein by reference.

EXAMPLE 2

Base I with Stabilizing System

The following Table II sets forth the amount of each stabilizer added to Base I.

TABLE II

| Ex. # | Viscarin® SA 359 ppm | Avicel® CL 611 ppm |
|---|---|---|
| 2a | 0 | 0 |
| 2b | 0 | 600 |
| 2c | 0 | 1200 |
| 2d | 0 | 1800 |
| 2e | 0 | 2400 |
| 2f | 150 | 0 |
| 2g | 150 | 600 |
| 2h | 150 | 1200 |
| 2i | 150 | 1800 |
| 2j | 150 | 2400 |
| 2k | 325 | 0 |
| 2l | 325 | 600 |
| 2m | 325 | 1200 |
| 2n | 325 | 1200 |
| 2o | 325 | 1800 |
| 2p | 325 | 2400 |
| 2q | 500 | 0 |
| 2r | 500 | 600 |
| 2s | 500 | 1200 |
| 2t | 500 | 1800 |
| 2u | 500 | 2400 |
| 2v | 650 | 0 |

TABLE II-continued

| Ex. # | Viscarin® SA 359 ppm | Avicel® CL 611 ppm |
|---|---|---|
| 2w | 650 | 600 |
| 2x | 650 | 1200 |
| 2y | 650 | 1800 |
| 2z | 650 | 2400 |

EXAMPLE 3

Base II with Stabilizing System

The following Table III sets forth the amount of each stabilizer added to Base II.

TABLE III

| Ex. # | Viscarin® SA 359 ppm | Avicel® CL 611 ppm |
|---|---|---|
| 3a | 0 | 10 |
| 3b | 0 | 600 |
| 3c | 0 | 1200 |
| 3d | 0 | 1800 |
| 3e | 0 | 2400 |
| 3f | 150 | 0 |
| 3g | 325 | 0 |
| 3h | 500 | 0 |
| 3i | 500 | 2400 |
| 3j | 650 | 0 |
| 3k | 650 | 600 |
| 3l | 650 | 1200 |
| 3m | 650 | 1800 |
| 3n | 650 | 2400 |

Example 2 is a factorial experimental design with a duplicate center point. The variables were Viscarin® SA 359 I-Cg at 0, 150, 325, 500 and 650 ppm and Avicel® CL 611 at 0, 600, 1200, 1800 and 2400 ppm.

The samples were prepared as described above and packaged in 8 oz glass bottles and sterilized. The bottles were then stored on a shelf at ambient temperature for 9 months.

The tests performed to evaluate stability were unshaken-measured cream layer, unshaken-measured whey layer and unshaken-measured sediment layer. Viscosity measurements were taken on each sample after shaking. The details on each test are set out below:

1) Unshaken-Measured Cream Layer, Measured Whey Layer, Measured Sediment Layer—Quiescently stored product packaged in a glass bottle was inspected for evidence of physical separation as cream, whey or sediment layers. The presence of any of these layers was measured in millimeters with an ordinary ruler and reported as such (i.e., 4 mm). The absence of cream, whey or sediment layers was represented as '0' (zero).

2) Viscosity—The product sample was shaken and the viscosity was measured using a Brook field Viscometer DVII Plus using a #1 spindle at ambient temperature (21° C.). Product viscosity at or below 100 centipoise was measured at 60 rpm. Product viscosity above 100 cps was measured at 30 rpm.

The data collected for each sample from Example 2 are found in Table IV.

TABLE IV

BASE I SAMPLES
9-Month Data

| | Stabilizer | | Unshaken | | | |
| | | | Measured | | Measured | |
| Sample # | Viscarin® SA 359 (ppm) | Avicel® CL 611 (ppm) | Cream Layer (mm) | Measured Whey Layer (mm) | Sediment Layer (mm) | Shaken Viscosity (cps) |
|---|---|---|---|---|---|---|
| 2a | 0 | 0 | 5 | 4 | 2 | 9.0 |
| 2b | 0 | 600 | 6 | 0 | 5 | 10.0 |
| 2c | 0 | 1200 | 5 | 0 | 0 | 11.2 |
| 2d | 0 | 1800 | 5 | 0 | 0 | 12.2 |
| 2e | 0 | 2400 | 4 | 0 | 0 | 13.4 |
| 2f | 150 | 0 | 7 | 5 | 2 | 9.7 |
| 2g | 150 | 600 | 5 | 3 | 8 | 11.9 |
| 2h | 150 | 1200 | 6 | 0 | 0 | 12.7 |
| 2i | 150 | 1800 | 6 | 0 | 0 | 13.9 |
| 2j | 150 | 2400 | 0 | 0 | 0 | 16.7 |
| 2k | 325 | 0 | 0 | 2 | 2 | 12.7 |
| 2l | 325 | 600 | 0 | 0 | 11 | 15.3 |
| 2m | 325 | 1200 | 0 | 0 | 0 | 16.4 |
| 2n | 325 | 1200 | 0 | 2 | 0 | 18.2 |
| 2o | 325 | 1800 | 5 | 0 | 0 | 20.7 |
| 2p | 325 | 2400 | 0 | 0 | 0 | 23.0 |
| 2q | 500 | 0 | 0 | 2 | 1 | 22.1 |
| 2r | 500 | 600 | 0 | 0 | 0 | 24.9 |
| 2s | 500 | 1200 | 0 | 0 | 0 | 33.6 |
| 2t | 500 | 1800 | 0 | 0 | 0 | 35.2 |
| 2u | 500 | 2400 | 0 | 0 | 0 | 44.7 |

TABLE IV-continued

BASE I SAMPLES
9-Month Data

| | Stabilizer | | Unshaken | | | |
| | | | Measured | | Measured | |
| Sample # | Viscarin® SA 359 (ppm) | Avicel® CL 611 (ppm) | Cream Layer (mm) | Measured Whey Layer (mm) | Sediment Layer (mm) | Shaken Viscosity (cps) |
|---|---|---|---|---|---|---|
| 2v | 650 | 0 | 0 | 0 | 0 | 44.6 |
| 2w | 650 | 600 | 0 | 0 | 0 | 57.4 |
| 2x | 650 | 1200 | 0 | 0 | 0 | 65.5 |
| 2y | 650 | 1800 | 0 | 0 | 0 | 85.5 |
| 2z | 650 | 2400 | 0 | 0 | 0 | 89.0 |

The data collected on the samples from Example 3 are found in Table V.

TABLE V

BASE II SAMPLES
9-Month Data

| | Stabilizer | | Unshaken | | | |
| | | | Measured | | Measured | |
| Sample # | Viscarin® SA 359 (ppm) | Avicel® CL 611 (ppm) | Cream Layer (mm) | Measured Whey Layer (mm) | Sediment Layer (mm) | Shaken Viscosity (cps) |
|---|---|---|---|---|---|---|
| 3a | 0 | 0 | 5 | 2 | 4 | 8.9 |
| 3b | 0 | 600 | 5 | 0 | 7 | 8.9 |
| 3c | 0 | 1200 | 5 | 0 | 2 | 10.9 |
| 3d | 0 | 1800 | 5 | 0 | 2 | 12.1 |
| 3e | 0 | 2400 | 7 | 2 | 2 | 15.1 |
| 3f | 150 | 0 | 6 | 2 | 5 | 9.8 |
| 3g | 325 | 0 | 7 | 2 | 6 | 12.2 |
| 3h | 500 | 0 | 2 | 0 | 6 | 23.2 |
| 3i | 500 | 2400 | 0 | 0 | 0 | 48.8 |
| 3j | 650 | 0 | 0 | 0 | 0 | 71.0 |
| 3k | 650 | 600 | 0 | 0 | 0 | 83.2 |
| 3l | 650 | 1200 | 0 | 0 | 0 | 138.0 |
| 3m | 650 | 1800 | 0 | 0 | 0 | 160.0 |
| 3n | 650 | 2400 | 0 | 0 | 0 | 182.0 |

Tables IV and V demonstrate that the present invention provides excellent stability to products that are very prone to creaming and sedimentation. In addition, the present invention does not increase viscosity beyond acceptable limits. One skilled in this art will understand that acceptable viscosity values depend upon the final product use. In general, a formulation is considered to be acceptable where there appears no discernible cream, whey or sediment layers in the unshaken formula (i.e., where these readings are zero) and when the viscosity is acceptably low. The data in Table IV demonstrate that after a period of nine months of quiescent storage, the formulation containing 150 ppm Viscarin® and 2400 parts per million Avicel® performed acceptably. Also, the formulation that contained 325 ppm of Viscarin® and 1200 ppm Avicel® performed in an acceptable manner when compared to the controls containing no stabilizer or only one of the two components at similar levels.

Table VI presents data on viscosity of the Base II product over quiescent and dynamic conditions. This test was performed on the Carri-Med rheometer, type CSL 50. The geometry of the device was a double concentric cylinder acrylic with a solvent trap and a gap setting of 500 microns. Sample size was 4 mL. For the zero time equilibration run, the sample was pro-sheared at 20 dynes/cm$^2$ for 1 minute. The sample was then allowed to set for about 10 seconds, which is known as the "0" equilibration time. The sample was then subjected to a continuous shear stress ramp in linear mode of from 0 to 35 dynes/cm$^2$ in a period of 5 minutes. For the 60-minute equilibration run, the procedure described above was used, except the equilibration time was increased to 60 minutes. The same sample was used for both runs.

Table VI presents the data on Base II with and without the stabilizing system of this invention.

TABLE VI

VISCOSITY OF BASE II UNDER VARIOUS STORAGE/FLOW CONDITIONS (AS MEASURED BY THE CARRI-MED RHEOMETER)

| Sample | Equilibrium Time (mins) | Shear Stress (dynes/cm$^2$) | | Shear Rate (1/sec) | |
|---|---|---|---|---|---|
| | | 0.2 (Quiescent) | 35.0 (Tube Flow) | 13.0 (Brookfield) | 100.0 (Pouring) |
| 3a - no stabilizer | 0 | 7.0(cps) | 5.2(cps) | 5.5(cps) | 5.4(cps) |
| 3e - 2400 ppm Avicel | 0 | 15.0 | 6.8 | 8.8 | 7.6 |
| 3e - 2400 ppm Avicel | 60 | 152.0 | 6.8 | 16.1 | 8.4 |
| 3h - 500 ppm Visc SA359 | 0 | 33.3 | 10.6 | 19.7 | 13.0 |
| 3h - 500 ppm Visc SA359 | 60 | 35.2 | 10.6 | 19.9 | 13.2 |
| 3i Visc SA359 + Avicel | 0 | 94.6 | 25.0 | 50.4 | 27.7 |
| – 500 ppm + 2400 ppm | 60 | 345.0 | 24.8 | 58.4 | 27.6 |

These data demonstrate that synergism is present in the combination of iota-carrageenan and MCC/CMC. More specifically, for a given equilibration time and under quiescent conditions of storage as represented by a shear stress of 0.2 dynes/cm$^2$, the sum of the viscosity values, of the samples with the individual stabilizers (3e, 3h) was far below the values for the sample containing both stabilizers (Sample 3i). This same effect is shown for the dynamic conditions (35.0 dynes/cm$^2$—Tube Flow). This same unexpected result is seen in the shear rate data. This synergism between carrageenan and Advicel® is a most unusual discovery. The stabilizer system of this invention thus provides higher viscosities when in a quiet or quiescent state than was possible with each stabilizer added alone. This high viscosity is highly beneficial for the prevention of creaming and sedimentation. Even more importantly, when the product is in a dynamic state, such as being poured from a container or flowing through a feeding robe, it evidences a low viscosity indicative of its highly pseudoplastic character. This critical feature of the present invention sets it apart from the solid food art, such as puddings, because puddings and solid food do not need to exhibit enhanced flow properties under dynamic conditions. This unique combination of iota-carrageenan and MCC/CMC is not suggested or disclosed in the prior art.

An additional test was conducted to demonstrate the unexpected properties of the present invention. This test is known as the "Creep Method." An explanation of the test is found in the reference Schenz, T. And Fugitt, M. (1992), "The rheology of thin liquids," in 'Gums and Stabilizers for the Food Industry 6,' eds. Phillips, G. O., Williams, P. A., and Wedlock, D. J., Oxford University Press, 113–116.

Table VII sets forth the data generated using the "Creep Method."

TABLE VII

DATA FROM CREEP CURVES FOR BASE II

| | Stabilizer Type/Amount | | | Data from Retardation Creep Curve | |
|---|---|---|---|---|---|
| Sample | Viscarin SA 359 ppm | Avicel CL 611 ppm | Equilibration Time mins | Strain @ 120 Secs | Newtonian Viscosity cps | Newtonian Shear Rate 1/sec |
| 3a | — | — | 0 | 117.1 | 35.2* | 0.5690 |
| 3a | — | — | 30 | 364.7* | 5.4 | 3.7020 |
| 3e | — | 2400 | 0 | 139.6 | 18.3 | 1.0950 |
| 3e | — | 2400 | 60 | 6.7 | 223.3 | 0.0896 |
| 3h | 500 | — | 0 | 77.1 | 35.9 | 0.5564 |
| 3h | 500 | — | 60 | 43.9 | 56.9 | 0.3515 |
| 3i | 500 | 2400 | 0 | 14.5 | 223.4 | 0.0890 |
| 3i | 500 | 2400 | 60 | 0.4 | 30,890.0 | 0.0006475 |

*These values seem abnormally high. There should be no difference between the 0' and 30' data for the unstabilized sample.

The same equilibration times were used as stated in the previous test. The data from the Creep Method also demonstrate that the stabilizer system of the present invention evidences synergism between the i-Cg and the CSS/CMC components.

Strain is inversely related to resistance to flow. Due apparently to its significant viscoelastic character, Sample 3i offered the greatest resistance and did not "flow" (lowest strain values). Sample 3i also had a very high "Newtonian viscosity" following the 60-minute equilibration which is the "secret" behind the stabilizer blend of this invention. Sample 3i was very successful in suspending the Base II formulation which contains a very high level of tricalcium phosphate.

INDUSTRIAL APPLICABILITY

The data demonstrate that the liquid nutritionals prepared in accordance with this invention possess improved physical stability with respect to creaming and sedimentation. The problems encountered by the medical and infant nutritional industry in preparing products that exhibit good shelf life (product stability) are unique. Due to the high loadings of insoluble minerals and oils found in these products and the desire to keep product viscosities as low as possible, the nutritional industry, until now, has failed to provide a solution to this long felt need. Through the discoveries disclosed in this invention the nutritional industry can prepare and supply liquid nutritional products that do not suffer from the problems of sedimentation and creaming.

While the liquid nutritional herein described and the method of making same constitute preferred embodiments of the invention, it is to be understood that the invention is not limited to this precise formulation and that changes may be made therein without departing from the scope of the invention which is defined in the appended claims.

What is claimed is:

1. A liquid nutritional product comprising:
   (a) a source of carbohydrate;
   (b) a source of protein;
   (c) a source of fat; said liquid nutritional product containing fat at a concentration sufficient to have said liquid nutritional mixture be susceptible to creaming;
   (d) a source of minerals; said minerals present at a concentration sufficient to have said liquid nutritional product be susceptible to sedimentation;
   (e) a stabilizer composition comprising:
      (i) iota-carrageenan present in an amount in the range of from about 100 ppm to about 800 ppm of said liquid nutritional product; and
      (ii) a mixture of microcrystalline cellulose and carboxymethyl cellulose, said mixture containing 85–91 wt. % microcrystalline cellulose and wherein said mixture is present in an amount in the range of from about 600 to about 3000 ppm of said liquid nutritional product.

2. A liquid nutritional product according to claim 1 wherein the ratio of said amount of said microcrystalline cellulose and carboxymethyl cellulose to said iota-carrageenan is in the range of from about 16:1 to about 1.2:1.

3. A liquid nutritional product according to claim 1 wherein the ratio of said mount of said microcrystalline cellulose and carboxymethyl cellulose to said iota-carrageenan is in the range of from about 16:1 to about 2.0:1.

4. A liquid nutritional product according to claim 1 wherein said iota-carrageenan is present in an mount in the range of from about 150 ppm to about 325 ppm of said liquid nutritional product, and wherein said mixture of microcrystalline cellulose and carboxymethyl cellulose is present in an mount in the range of from about 1200 to about 2400 ppm of said liquid nutritional product; and wherein the ratio of said amount of said microcrystalline cellulose and carboxymethyl cellulose to said iota-carrageenan is in the range of from about 16:1 to about 3.7:1.

5. A liquid nutritional product according to claim 1 wherein said iota-carrageenan is present in an amount of about 300 to 500 ppm, and wherein said mixture of microcrystalline cellulose and carboxymethyl cellulose is present in an amount of about 600 to about 1500 ppm.

6. A liquid nutritional product according to claim 1 wherein said iota-carrageenan is present in an amount of about 400–650 ppm, and wherein said mixture of microcrystalline cellulose and carboxymethyl cellulose is present in an amount of about 950–1050 ppm.

7. A liquid nutritional product according to claim 6 wherein said mixture of microcrystalline cellulose and carboxymethyl cellulose is 85% microcrystalline cellulose with 70% colloidal content, and is co-processed with 15% low viscosity carboxymethyl cellulose.

8. A liquid nutritional product according to claim 1 wherein said iota-carrageenan is present in an amount of about 150 ppm, and wherein said mixture of microcrystalline cellulose and carboxymethyl cellulose is present in an amount of about 2400 ppm.

9. A liquid nutritional product according to claim 8 wherein said mixture of microcrystalline cellulose and carboxymethyl cellulose is 85% microcrystalline cellulose with 70% colloidal content, and is co-processed with 15% low viscosity carboxymethyl cellulose.

10. A liquid nutritional product according to claim 1 wherein said mixture of microcrystalline cellulose and carboxymethyl cellulose is 85% microcrystalline cellulose with 70% colloidal content, and is co-processed with 15% low viscosity carboxymethyl cellulose.

11. A liquid nutritional product according to claim 1 wherein said suspended minerals comprise at least about 0.2 grams of tricalcium phosphate per liter of said liquid nutritional product, and wherein said iota-carrageenan is present in an amount of about 500 ppm, and wherein said mixture of microcrystalline cellulose and carboxymethyl cellulose is present in an amount of about 2400 ppm.

12. A liquid nutritional composition comprising:
   (a) fat at a concentration sufficient to have said liquid nutritional mixture be susceptible to creaming and suspended minerals present at a concentration sufficient to have said liquid nutritional mixture be susceptible to sedimentation; and
   (b) a stabilizing composition comprising:
      (i) iota-carrageenan present in an amount of about 100–800 ppm of said liquid nutritional product;
      (ii) a mixture of microcrystalline cellulose and carboxymethyl cellulose, said mixture containing 85–91 wt. % microcrystalline cellulose and wherein said mixture is present in an amount of from about 600–3000 ppm of said liquid nutritional product.

13. A liquid nutritional product according to claim 12 wherein the ratio of said mount of said microcrystalline cellulose and carboxymethyl cellulose to said iota-carrageenan is in the range of from about 16:1 to about 1.2:1.

14. A liquid nutritional product according to claim 12 wherein the ratio of said amount of said microcrystalline cellulose and carboxymethyl cellulose to said iota-carrageenan is in the range of from about 16:1 to about 2.0:1.

15. A liquid nutritional product according to claim 12 wherein said iota-carrageenan is present in an amount in the range of from about 150 ppm to about 325 ppm of said liquid nutritional product, and wherein said mixture of microcrystalline cellulose and carboxymethyl cellulose, is present in an amount in the range of from about 1200 to about 2400 ppm of said liquid nutritional product; and wherein the ratio of said amount of said microcrystalline cellulose and carboxymethyl cellulose to said iota-carrageenan is in the range of from about 16:1 to about 3.7:1.

16. A liquid nutritional product according to claim 12 wherein said iota-carrageenan is present in an mount of about 500 ppm, and wherein said mixture of microcrystalline cellulose and carboxymethyl cellulose is present in an mount of about 600 ppm.

17. A liquid nutritional product according to claim 16 wherein said mixture of microcrystalline cellulose and carboxymethyl cellulose is 85% microcrystalline cellulose with 70% colloidal content, and is co-processed with 15% low viscosity carboxymethyl cellulose.

18. A liquid nutritional product according to claim 12 wherein said iota-carrageenan is present in an amount of about 325 ppm, and wherein said mixture of microcrystalline cellulose and carboxymethyl cellulose is present in an mount of about 1200 ppm.

19. A liquid nutritional product according to claim 18 wherein said mixture of microcrystalline cellulose and carboxymethyl cellulose is 85% microcrystalline cellulose with 70% colloidal content, and is co-processed with 15% low viscosity carboxymethyl cellulose.

20. A liquid nutritional product according to claim 12 wherein said iota-carrageenan is present in an amount of about 150 ppm, and wherein said mixture of microcrystalline cellulose and carboxymethyl cellulose is present in an amount of about 2400 ppm.

21. A liquid nutritional product according to claim 12 wherein said mixture of microcrystalline cellulose and carboxymethyl cellulose is 85% microcrystalline cellulose with 70% colloidal content, and is co-processed with 15% low viscosity carboxymethyl cellulose.

22. A liquid nutritional product according to claim 12 wherein said suspended minerals comprise at least about 0.2 grams of tricalcium phosphate per liter of said liquid nutritional product, and wherein said iota-carrageenan is present in an amount of about 500 ppm, and wherein said mixture of microcrystalline cellulose and carboxymethyl cellulose is present in an amount of about 2400 ppm.

* * * * *